United States Patent [19]
Kim et al.

[11] Patent Number: 5,743,104
[45] Date of Patent: Apr. 28, 1998

[54] TEMPERATURE CONTROLLING METHOD FOR REFRIGERATOR AND APPARATUS THEREFOR

[75] Inventors: Jae-in Kim, Seoul; Yun-seok Kang, Suwon; Seong-wook Jeong, Seoul, all of Rep. of Korea

[73] Assignee: Samsung Electronics Co., Ltd., Kyungki-do, Rep. of Korea

[21] Appl. No.: 820,339

[22] Filed: Mar. 12, 1997

[30] Foreign Application Priority Data

Apr. 2, 1996 [KR] Rep. of Korea .................. 96-9913

[51] Int. Cl.$^6$ .................................................. F25D 29/00
[52] U.S. Cl. ........................... 62/209; 236/91 E; 62/231
[58] Field of Search .............................. 62/208, 209, 229, 62/231, 157, 180, 186, 203, 213; 365/557; 374/110, 115; 236/91 A, 91 E, 91 F

[56] References Cited

U.S. PATENT DOCUMENTS

| | | | |
|---|---|---|---|
| 4,381,549 | 4/1983 | Stamp, Jr. et al. | 364/557 |
| 5,335,514 | 8/1994 | Hennessee et al. | 62/209 X |
| 5,584,437 | 12/1996 | Deuk Ik et al. | 62/186 X |

FOREIGN PATENT DOCUMENTS

2254452 A   10/1992   United Kingdom.

Primary Examiner—Harry B. Tanner
Attorney, Agent, or Firm—Burns, Doane, Swecker & Mathis, LLP

[57] ABSTRACT

A temperature controlling method for a refrigerator and an apparatus therefor are provided, in which a sensing error between temperature sensors is corrected, thereby maintaining the interior temperature of the refrigeration compartment in equilibrium. The temperature controlling method includes the steps of: sensing temperatures of the different locations within the refrigeration compartment using the plurality of temperature sensors several times when the temperatures in the refrigeration compartment are in equilibrium; calculating the average temperatures of the respective temperature sensors from a number of the temperatures respectively sensed by the plurality of temperature sensors; selecting one of the plurality of temperature sensors as a reference sensor and calculating error values of the average temperatures of the remaining temperature sensors with respect to that of the reference sensor; adding the error values of the respective temperature sensors to the temperatures directly sensed by the corresponding temperature sensors to obtain corrected temperature values; and controlling discharge of cool air based on the corrected temperature values. Also, the temperature controlling apparatus includes an operator for calculating corrected temperature values and a controller for controlling the discharge of the cool air.

6 Claims, 7 Drawing Sheets

TEMPERATURE CONTROLLING METHOD FOR REFRIGERATOR AND APPARATUS THEREFOR

BACKGROUND OF THE INVENTION

The present invention relates to a temperature controlling method for a refrigerator and an apparatus therefor.

In a refrigerator, a plurality of temperature sensors are dispersedly located in a refrigeration compartment, and cool air is forcibly provided to a portion having a relatively high temperature based on the temperatures sensed by the temperature sensors, thereby evenly maintaining the temperature inside the refrigeration compartment.

FIG. 1 is a flowchart illustrating a conventional temperature controlling method. As shown in FIG. 1, after the temperatures (F1 and F2) of two different portions have been sensed by two temperature sensors (step P1), the temperatures F1 and F2 are compared in step P2. Then, cool air is forcibly discharged into a high-temperature portion by a cool air discharging fan based on the compared result (steps P3 and P4).

However, the temperature sensors installed in the refrigeration compartment cannot all have the same sensing characteristics as each other. That is, as shown in FIGS. 2A and 2B, the temperature sensors may have temperature-sensing errors in the manufacturing process of a batch of sensors and such an error may even exist within the same batch of sensors. Thus, the temperatures F1 and F2 sensed by the temperature sensors may be different even though the real temperatures are the same. FIG. 2B shows that a significant temperature difference exists between temperatures F1' and F2' sensed by different temperature sensors while the difference between temperatures F1 and F2 sensed by different sensors is small in FIG. 2A. Thus, when difference in temperatures sensed by such different temperature sensors exists, a portion of the refrigeration compartment is overcooled while another portion thereof is undercooled.

SUMMARY OF THE INVENTION

In order to solve the above problems, it is an object of the present invention to provide a temperature controlling method for a refrigerator in which sensing errors between temperature sensors are corrected, to evenly maintain the temperature of a refrigeration compartment of the refrigerator, and an apparatus therefor.

According to an aspect of the present invention, there is provided a temperature controlling method for a refrigerator in which cool air is discharged into a portion requiring the cool air based on temperature signals sensed by a plurality of temperature sensors positioned at different locations in the refrigeration compartment, the temperature controlling method comprising the steps of: (a) sensing temperatures of the different locations within the refrigeration compartment using the plurality of temperature sensors several times when the temperatures in the refrigeration compartment are in equilibrium; (b) calculating the average temperatures of the respective temperature sensors from a number of the temperatures respectively sensed by the plurality of temperature sensors; (c) selecting one of the plurality of temperature sensors as a reference sensor and calculating error values of the average temperatures of the remaining temperature sensors with respect to that of the reference sensor; (d) adding the error values of the respective temperature sensors to the temperatures directly sensed by the corresponding temperature sensors to obtain corrected temperature values; and (e) controlling discharge of cool air based on the corrected temperature values.

Preferably, the average temperatures of the temperatures respectively sensed by the plurality of temperature sensors are calculated prior to use of the refrigerator, and the error values are stored in a memory to be used as a temperature correcting value whenever the temperatures sensed by the temperature sensors are to be corrected, and temperatures are measured by operating at least two cycles for calculating the average temperatures of the respective temperature sensors.

Also, according to another aspect of the present invention, there is provided a temperature controlling apparatus for a refrigerator comprising: at least two temperature sensors positioned at a plurality of locations of a refrigeration compartment; an operator for calculating an average temperature of each temperature sensor from a plurality of temperature signals sensed by each temperature sensor when the temperature of the refrigeration compartment is in equilibrium, calculating error values of the average temperatures of the remaining temperature sensors with respect to that of an arbitrary reference sensor, and obtaining corrected temperature values by adding the error values to the temperatures sensed by each temperature sensor; and a controller for controlling the discharge of cool air into a determined location of the refrigeration compartment based on the corrected temperature values.

Preferably, the temperature controlling apparatus further comprises a memory for storing the error values.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
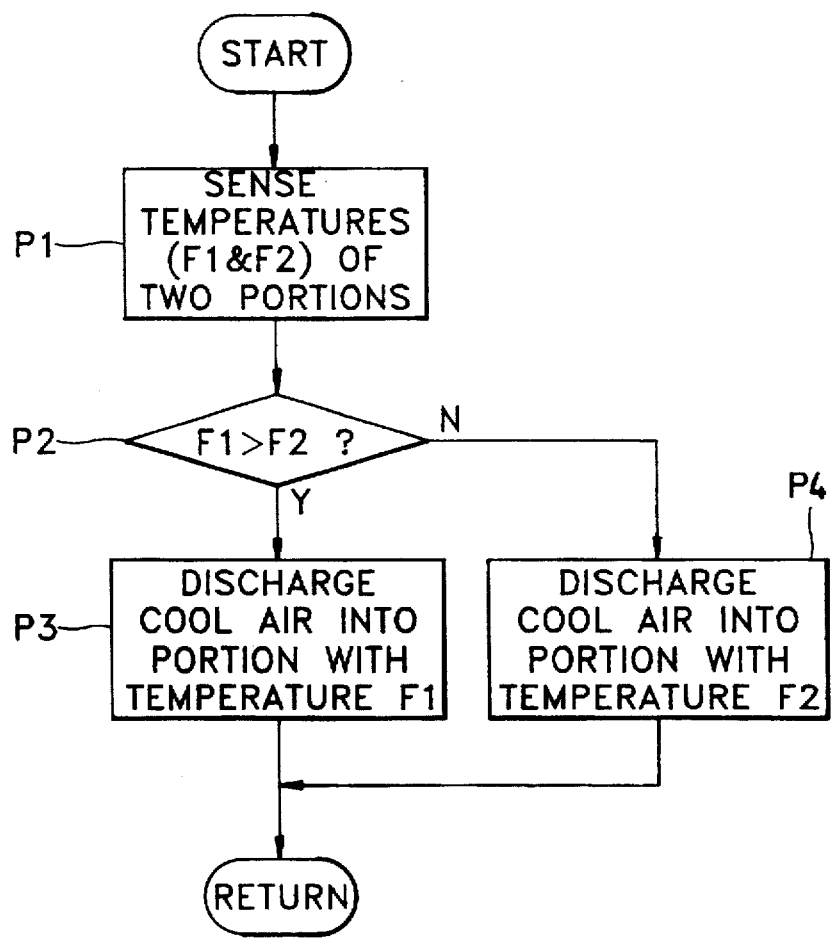
FIG. 1 is a flowchart illustrating a conventional temperature controlling method.
Figure 2A:
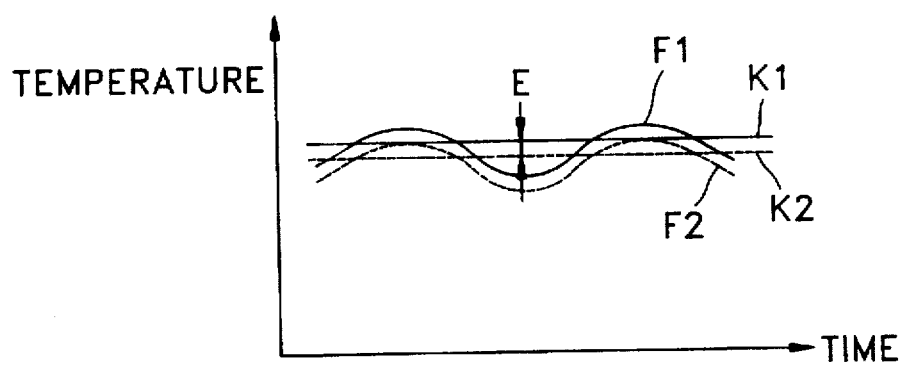
FIGS. 2A and 2B are graphs showing the difference in temperatures sensed by temperature sensors disposed at different locations in a refrigeration compartment of a conventional refrigerator.
Figure 2B:
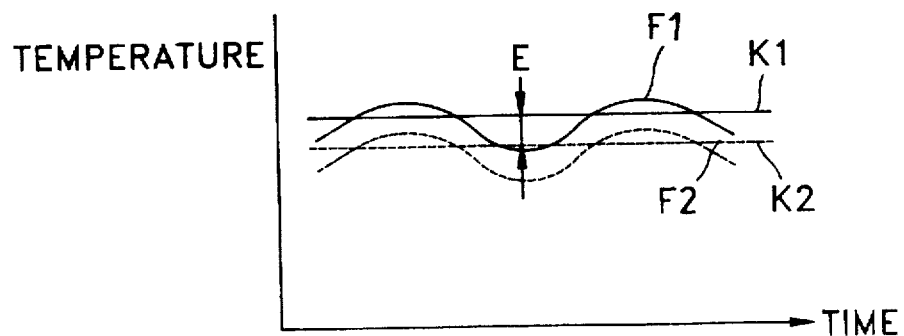
Figure 3:
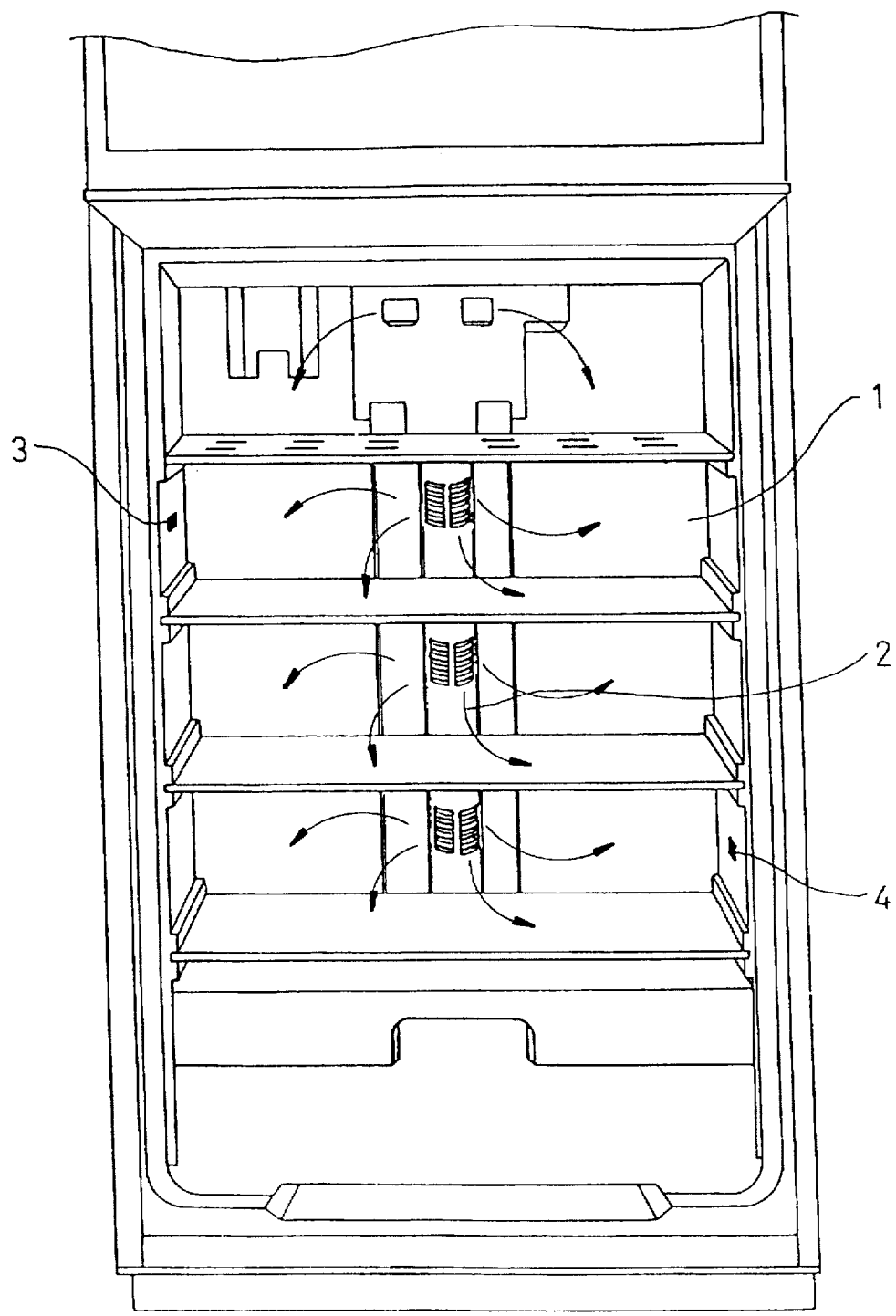
FIG. 3 is a perspective view showing the inside of the refrigeration compartment of a refrigerator.
Figure 4:
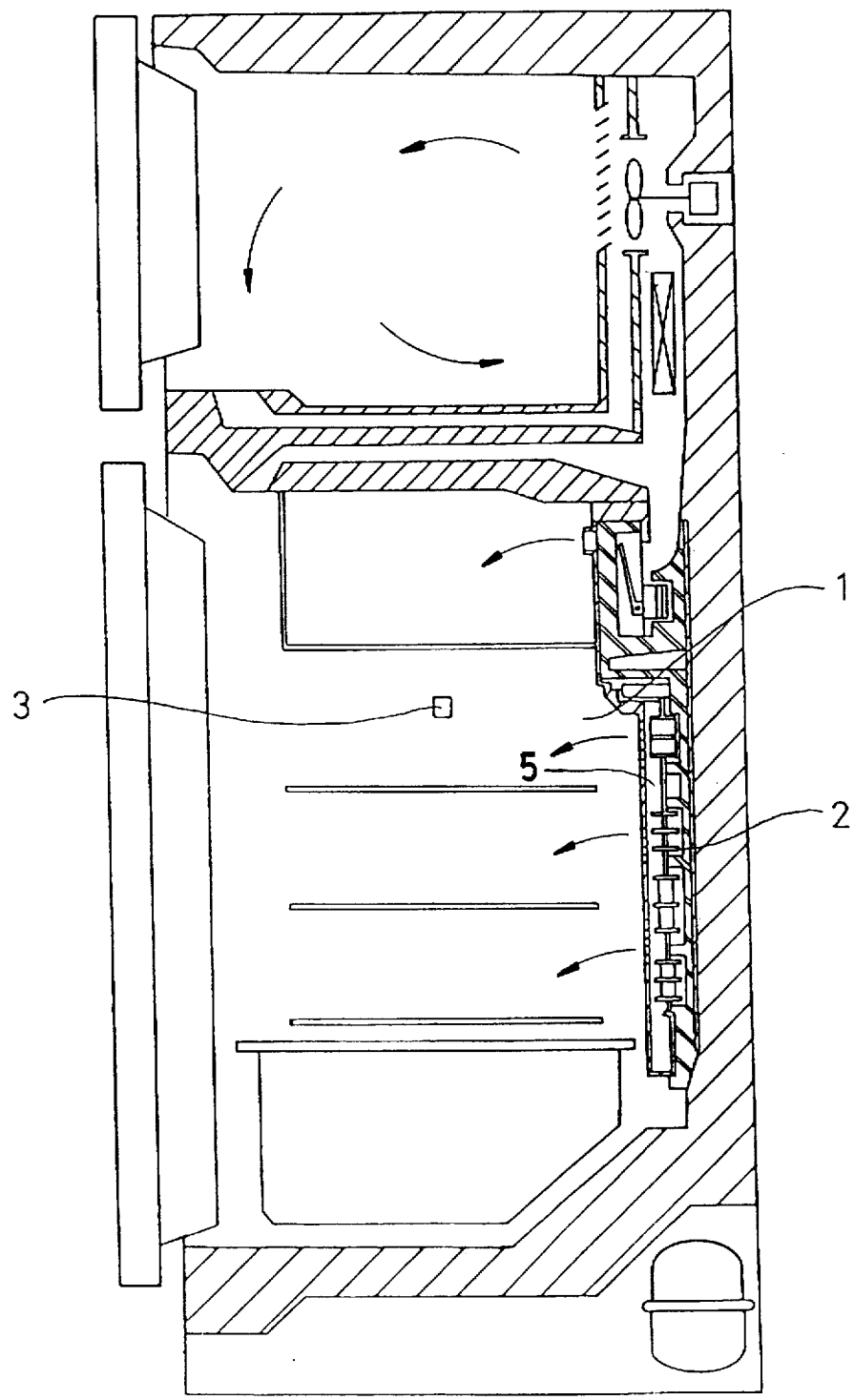
FIG. 4 is a side sectional view of the refrigerator shown in FIG. 3.

As shown in FIGS. 3 and 4, a cool air passage 5 along which cool air flows is formed at the center of a rear wall of a refrigeration compartment 1 and a plurality of cool air discharging fans 2 for discharging the cool air flowing along the cool air passage 5 into the refrigeration compartment 1 are arranged along the cool air passage 5. Assuming that the height of the refrigeration compartment is "H", temperature sensors 3 and 4 are positioned at 3H/4 of a left wall and at 1H/3 of a right wall of the refrigeration compartment 1, wherein the temperature sensors 3 and 4 are for sensing the temperatures in the upper and lower portions of the refrigeration compartment 1, respectively.

Figure 5:
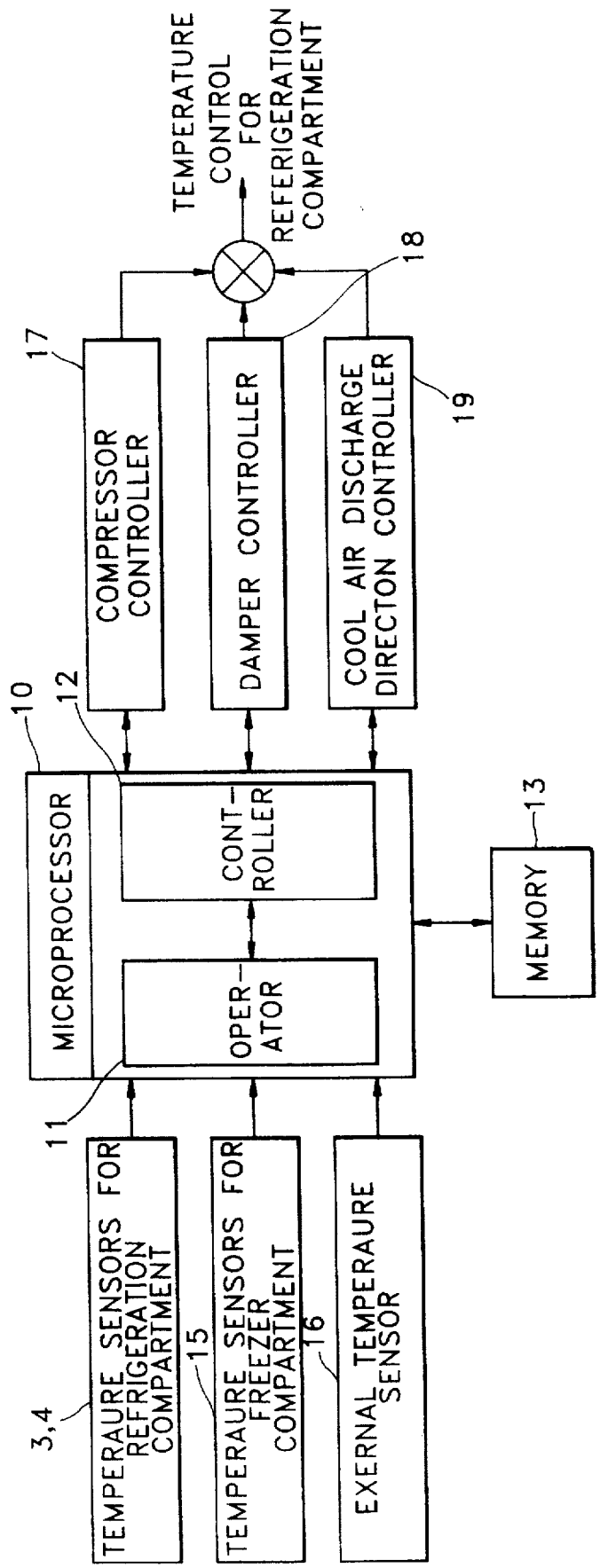
FIG. 5 is a schematic diagram showing the structure of a temperature controlling apparatus for a refrigerator according to the present invention.

FIG. 5 is a schematic diagram showing a temperature controlling apparatus for a refrigerator according to the present invention. A microprocessor 10 for controlling various devices of the refrigerator is comprised of an operator 11 and a controller 12. The microprocessor 10 is connected to temperature sensors 3 and 4 for sensing the temperature in the refrigeration compartment, a temperature sensor 15 for sensing the temperature of the freezer compartment and an external temperature sensor 16 for sensing the temperature outside the refrigerator. Also, the microprocessor 10 is connected to a compressor controller 17, a damper controller 18 and a cool air discharge direction controller 19 which are controlled by the controller 12 of the microprocessor 12. In addition, a memory 13 for storing a basic information required for the operating and controlling processes is attached to the microprocessor 10.

The operator 11 of the microprocessor 10 calculates an average temperature of each of the temperatures respectively sensed by the temperature sensors 3 and 4 for the refrigeration compartment and the temperature sensor 15 for the freezer compartment, when the temperature within the refrigeration compartment is in equilibrium. Then, error values from each of the average temperatures of the remaining temperature sensors based on the average temperature of a reference sensor which is arbitrary selected from the temperature sensors are obtained and then the error values are added to each of the temperature values sensed by each of the temperature sensors to obtain corrected temperature values. Thereafter, the corrected temperature values are provided to the controller 12 of the microprocessor 10 to be used as a control value for controlling the compressor controller 17, the damper controller 18 and the cool air discharging direction controller 19. The error values of the average temperature values calculated by the operator 11 are stored in the memory 13 to be used as values for correcting the temperature when the temperature is controlled by the microprocessor 10.

Figure 6:
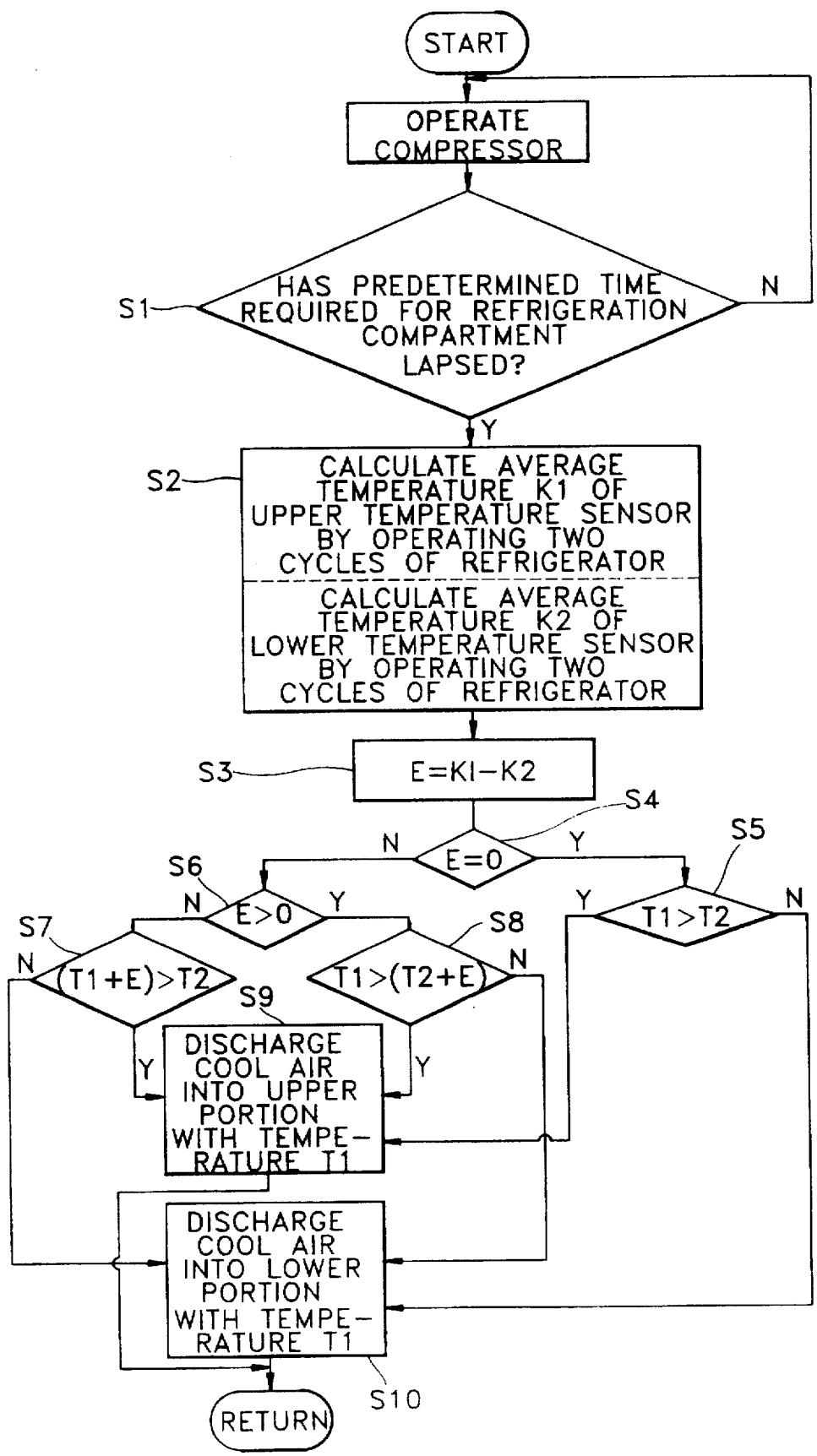
FIG. 6 is a flowchart illustrating a temperature controlling method by the temperature controlling apparatus shown in FIG. 5.

A temperature controlling method by the above temperature controlling apparatus is described with reference to the flowchart shown in FIG. 6. After supplying cool air to the refrigeration compartment by operating a compressor, a determination of whether a predetermined time required for obtaining an equilibrium temperature in the refrigeration compartment has lapsed, i.e., about 8 hours (step S1). If the predetermined time has passed the operator 11 of the microprocessor 10 calculates the average temperatures K1 and K2 (see FIGS. 7A and 7B) from the temperatures sensed by the temperature sensors 3 and 4 positioned at the upper and lower portions of the refrigeration compartment 1, each corresponding to 3H/4 of the left wall and 1H/3 of the right wall, by operating two cycles of the refrigerator (step S2). Then, the average temperature K2 sensed by the temperature sensor 4 is subtracted from the average temperature K1 sensed by the temperature sensor 3 to obtain an error value E (step S3). Then, a determination of whether the obtained error value E is equal to "0" is made (step S4). If E=0, the microprocessor 10 directly compares the temperatures T1 and T2 which are sensed by the two temperature sensors 3 and 4 (step S5), wherein E=0 means that there is no temperature-sensing error between the two temperature sensors 3 and 4. However, if E≠0, that is, a temperature-sensing error exists, a determination of whether the error E is greater or less than "0" is made (step S6).

If it is determined in step S4 that E=0, the temperatures T1 and T2 sensed by the temperature sensors 3 and 4 which are respectively positioned at the upper and lower portions of the refrigeration compartment 1 are compared (step S5) to discharge cool air into a relatively high-temperature portion (steps S9 and S10). On the contrary, if E>0, it is determined that the temperature T2 sensed by the temperature sensor 4 is lower than the temperature T1 sensed by the temperature sensor 3 of the refrigeration compartment 1, so that E is added to the temperature T2 sensed by the temperature sensor 4 to obtain a corrected temperature T2+E. Then, the corrected temperature T2+E is compared with the temperature T1 sensed by the temperature sensor 3 (step S8). If the temperature T1 sensed by the temperature sensor 3 positioned at the upper portion of the refrigeration compartment 1 is greater than the corrected temperature T2+E, the cool air is discharged into the upper portion of the refrigeration compartment 1 (step S9). However, if it is determined in step S8 that the temperature T1 is less than the corrected temperature T2+E, the cool air is discharged into the lower region of the refrigeration compartment 1 (step S10). Meanwhile, if it is determined in step S6 that E<0, it is determined that the temperature T2 sensed by the temperature sensor 4 positioned at the lower portion of the refrigeration compartment 1 is higher than the temperature T1 sensed by the temperature sensor 3, so that E is added to the temperature T1 sensed by the temperature sensor 3 to obtain a corrected temperature T1+E. Then, the corrected temperature T1+E is compared with the temperature T2 sensed by the temperature sensor 4 (step S7). If the corrected temperature T1+E is greater than the temperature T2 sensed by the temperature sensor 4 positioned at the lower portion of the refrigeration compartment 1, cool air is discharged into the upper portion of the refrigeration compartment 1 (step S9). However, if it is determined in step S7 that the corrected temperature T1+E is less than the temperature T2, cool air is discharged into the lower portion of the refrigeration compartment 1 (step S10).

Figure 7A:
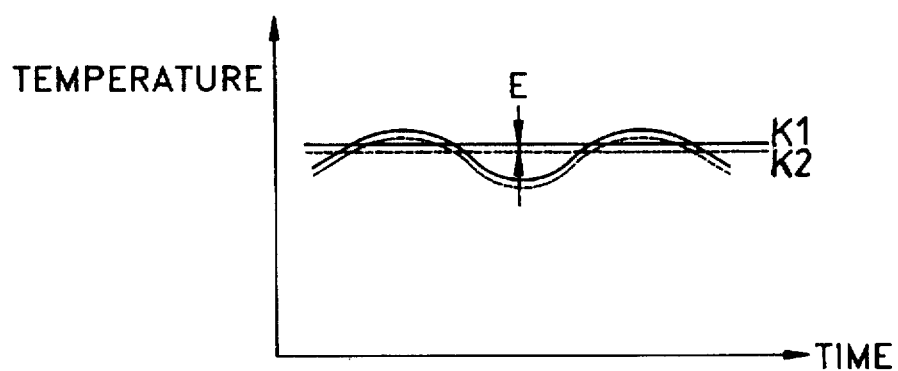
FIGS. 7A and 7B are graphs obtained after the temperature deviation shown in FIGS. 2A and 2B have been corrected by the temperature controlling method of the present invention.
Figure 7B:
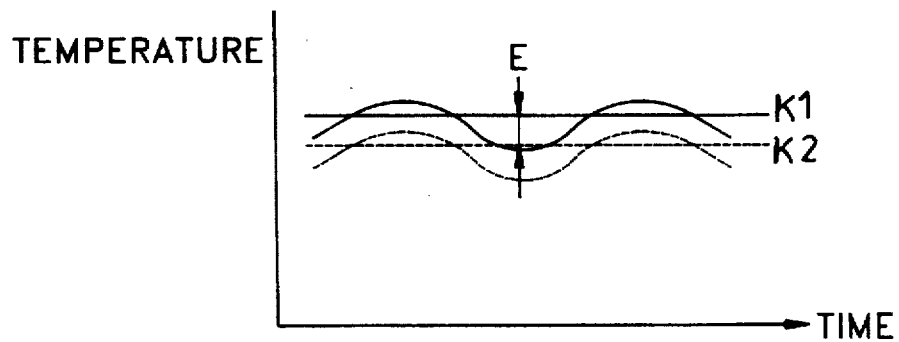

On the other hand, the calculated error value E is stored in the memory 13 to be reused whenever the temperature of the refrigeration compartment 1 is controlled. That is, the average temperature from each of the plurality of temperature sensors and each error value E thereof are calculated only once before the refrigerator is used, and then the calculated result is stored in the memory. Accordingly, the temperatures sensed by the temperature sensors can be corrected to a real temperature such as K1+E or K2+E as shown in FIGS. 7A and 7B, thereby evenly controlling the interior temperature of the refrigerator.

As described above, according to the temperature controlling method and apparatus therefor of the present invention, a sensing error between temperature sensors is corrected, so that the interior temperature of the refrigeration compartment can be evenly maintained.

What is claimed is:

1. A temperature controlling method for a refrigerator in which cool air is discharged into a portion requiring the cool air based on temperature signals sensed by a plurality of temperature sensors positioned at different locations in the refrigeration compartment, the temperature controlling method comprising the steps of:

(a) sensing temperatures of the different locations within the refrigeration compartment using said plurality of temperature sensors several times when the temperatures in the refrigeration compartment are in equilibrium;

(b) calculating the average temperatures of the respective temperature sensors from a number of the temperatures respectively sensed by said plurality of temperature sensors;

(c) selecting one of said plurality of temperature sensors as a reference sensor and calculating error values of the average temperatures of the remaining temperature sensors with respect to that of the reference sensor;

(d) adding the error values of the respective temperature sensors to the temperatures directly sensed by the corresponding temperature sensors to obtain corrected temperature values; and (e) controlling discharge of cool air based on the corrected temperature values.

2. A temperature controlling method for a refrigerator as claimed in claim 1, wherein the average temperatures of the temperatures respectively sensed by said plurality of temperature sensors are calculated prior to use of the refrigerator.

3. A temperature controlling method for a refrigerator as claimed in claim 1, wherein the error values are stored in a memory to be used as a temperature correcting value whenever the temperatures sensed by said plurality of temperature sensors are to be corrected.

4. A temperature controlling method for a refrigerator as claimed in claim 1, wherein temperatures are measured by operating at least two cycles for calculating the average temperatures of said respective temperature sensors.

5. A temperature controlling apparatus for a refrigerator comprising:

at least two temperature sensors positioned at a plurality of locations of a refrigeration compartment;

an operator for calculating an average temperature of each temperature sensor from a plurality of temperature signals sensed by each temperature sensor when the temperature of the refrigeration compartment is in equilibrium, calculating error values of the average temperatures of the remaining temperature sensors with respect to that of an arbitrary reference sensor, and obtaining corrected temperature values by adding the error values to the temperatures sensed by each temperature sensor; and a controller for controlling the discharge of cool air into a determined location of the refrigeration compartment based on the corrected temperature values.

6. A temperature controlling apparatus for a refrigerator as claimed in claim 5, further comprising a memory for storing the error values.

* * * * *